United States Patent [19]
Howard et al.

[11] Patent Number: 6,013,996
[45] Date of Patent: Jan. 11, 2000

[54] PRECISION STOP CONTROL FOR MOTORS

[75] Inventors: David E. Howard, Hazel Green; Justino Montenegro, Huntsville, both of Ala.

[73] Assignee: The United States of America as represented by the Administrator of National Aeronautics and Space Adminstration, Washington, D.C.

[21] Appl. No.: 09/128,633

[22] Filed: Jul. 27, 1998

[51] Int. Cl.[7] ............................... G05B 13/00; H02P 5/00
[52] U.S. Cl. ..................... 318/561; 318/592; 318/594; 318/603
[58] Field of Search .................... 318/560–696; 360/75, 70, 77.1, 78.6; 388/800; 369/44.28, 44.29, 32, 44.25, 44.27

[56] References Cited

U.S. PATENT DOCUMENTS

| | | | |
|---|---|---|---|
| 3,619,757 | 11/1971 | Loerger | 318/685 |
| 4,063,140 | 12/1977 | Kammerer et al. | 318/564 |
| 4,162,438 | 7/1979 | Osder | 318/564 |
| 4,227,137 | 10/1980 | Hartman | 318/801 |
| 5,090,002 | 2/1992 | Chow et al. | 369/44.28 |
| 5,194,788 | 3/1993 | Hashimoto | 318/561 |
| 5,318,796 | 6/1994 | Torpey et al. | 427/8 |
| 5,404,254 | 4/1995 | Kisaka | 360/78.6 |
| 5,444,345 | 8/1995 | Jinnai | 318/603 |

OTHER PUBLICATIONS

David E. Howard and Justino Montenegro, Antiovershoot Position Control for Motors Run at Full Speed, *NASA Tech Briefs*, Feb. 1988, vol. 22 #2, p. 4b Motion Control Tech Briefs.

*Primary Examiner*—Paul Ip
*Attorney, Agent, or Firm*—Robert L. Broad, Jr.

[57] ABSTRACT

An improved stop control system and method are provided for a motor having a drive mechanism in which the motor is coupled to a motor controller that controls the speed and position of the drive mechanism using a first signal indicative of a commanded position of the drive mechanism, a second signal indicative of the actual speed of the drive mechanism and a third signal indicative of the actual position of the drive mechanism. The improved system/method uses a first circuit that receives the first and third signal and generates an error signal indicative of a difference therebetween. A second circuit receives the error signal and compares same with a threshold position error. The result of this comparison is used to selectively supply the second signal (i.e., speed) to the motor controller at least whenever the error signal is less than the threshold position error so that the motor controller can use the second signal in conjunction with the third signal to stop the motor.

8 Claims, 2 Drawing Sheets

PRECISION STOP CONTROL FOR MOTORS

ORIGIN OF THE INVENTION

The invention made by employees of the United States Government and may be manufactured and used by or for the Government for governmental purposes without the payment of any royalties.

BACKGROUND OF THE INVENTION

1. Field of the Invention

This invention relates to motor control. More specifically, the invention is a control system and method for use with position-controlled motors that allows the motor to be stopped precisely without overshoot even when the motor is operating at or near full speed.

2. Description of the Related Art

Various motors and their control systems are known in the art. One conventional motor/control system is illustrated in block diagram form in FIG. 1 where a position loop is closed around a motor 10. More specifically, motor 10 incorporates or is coupled to a drive mechanism 12 that typically rotates or moves linearly. Drive mechanism 12 (and/or motor 10) has a position sensor 16 coupled thereto to provide signals indicative of actual position of drive mechanism 12 at any given time for use as a feedback input to a motor controller 18. A commanded position is issued from a master control (not shown) to motor controller 18 which uses the command in conjunction with the position feedback signals to control motor 10.

Full speed of motor 10 is reached when the motor's inertia and drive mechanism's inertia are both accelerated to full speed for a given motor voltage. How quickly motor 10 can accelerate is usually limited by the maximum current to motor 10. For applications where the maximum speed of the drive mechanism is desired, motor 10 is run at it's full speed when provided with a certain supply voltage. If the inertia of motor 10 and drive mechanism 12 is low, motor 10 (and drive mechanism 12) can be stopped using just a standard position control loop. However, for systems with greater inertia or systems requiring a greater degree of motor damping, rate or speed feedback can be used in conjunction with actual position feedback. That is, it is well known in the art of control engineering to improve or stabilize a position control loop by adding in rate or speed feedback. This is illustrated in FIG. 1 where a speed sensor 14 is coupled to drive mechanism 12 (and/or motor 10) to provide motor controller 18 with the actual speed of drive mechanism 12. Specifically, as is known in the art of motor control, motor controller 18 uses position information from sensor 16 to determine when to stop motor 10 and uses speed information from sensor 14 to generate a damping coefficient.

However, there is one problem associated with this type of system when motor 10 runs at or near full speed while moving drive mechanism 12 from a first position to a second position. Once the second position has been reached, little or no overshoot is desired. Yet, this can be very difficult to achieve, especially in high inertia systems. If the speed feedback signal is used to obtain the desired damping coefficient during the motor's entire run cycle, motor 10 will not run at full speed as drive mechanism 12 moves from the first to second position. On the other hand, if no speed feedback is used and motor 10 is allowed to run at or near full speed as drive mechanism 12 travels from the first to second position, the desired damping coefficient will not be available when drive mechanism 12 reaches the second position.

SUMMARY OF THE INVENTION

Accordingly it is an object of the present invention to provide an improved system and method of closing a position loop around a motor.

Another object of the present invention improved system and method that allows a motor to be stopped precisely even when the motor is run at near full speed.

Other object and advantages of the present invention will become more obvious hereinafter in the specification and drawings.

In accordance with the present invention, an improved stop control system and method are provided for a motor having a drive mechanism. The motor is coupled to a motor controller that controls the speed and position of the drive mechanism using a first signal indicative of a commanded position of the drive mechanism, a second signal indicative of the actual speed of the drive mechanism and a third signal indicative of the actual position of the drive mechanism. A first circuit receives the first and third signal and generates an error signal indicative of a difference between the first and third signal. A second circuit coupled to the first circuit receives the error signal and compares same with a threshold position error to generate a switch control signal. A switch has its signal input coupled to the motor to receive the second signal, a control input coupled to the second circuit for receiving the switch control signal, and an output coupled to the motor controller. The switch operates to control coupling of the signal input to the output using the switch control signal. Specifically, the signal input is coupled to the output at least whenever the error signal is less than the threshold position error so that the motor controller can use the second signal in conjunction with the third signal to stop the motor.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
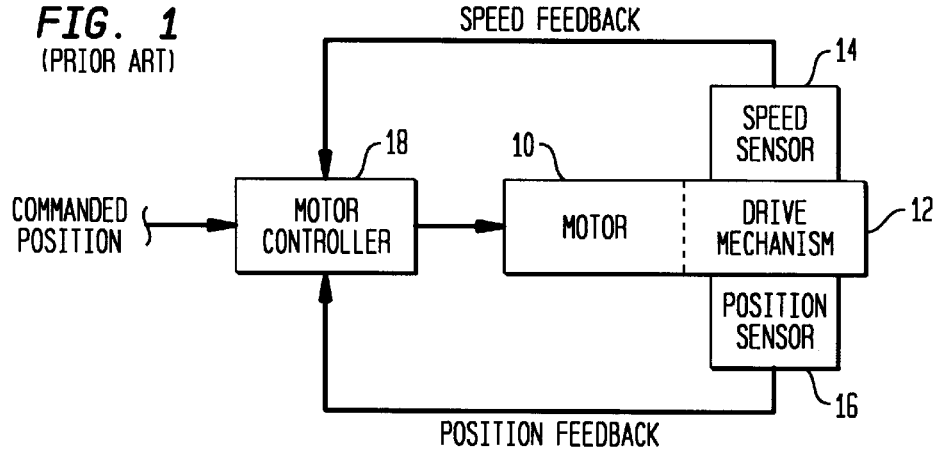
FIG. 1 is a block diagram of a prior art motor and control system therefor.

Referring again to the drawings, an improved stop control system is added to the prior art motor and control system illustrated in FIG. 1 where like reference numerals are used for common elements. The principles of the present invention will be described using the block diagrams illustrated in FIGS. 2 and 3. Then, by way of example, a specific implementation of the present invention will be described using the circuit diagram illustrated in FIG. 4.

Figure 2:
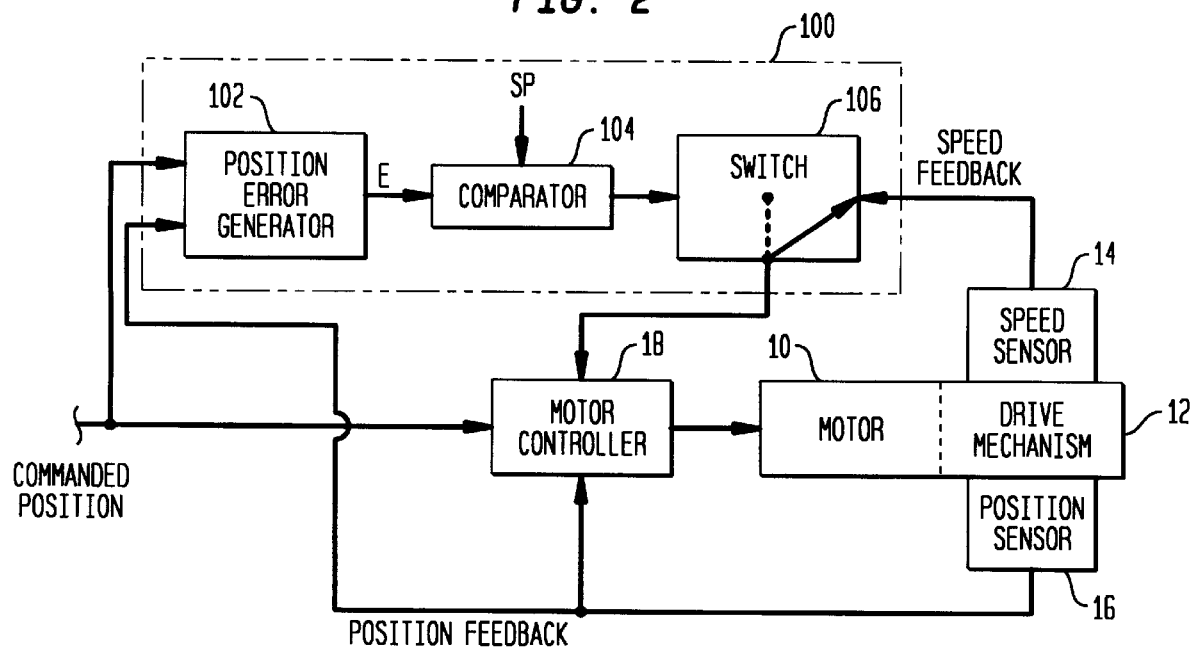
FIG. 2 is a block diagram of the motor and control system of the prior art improved with precision stop control according to the present invention.

Referring first to FIG. 2, stop control system 100 includes a position error generator 102 connected to receive the signals indicative of the commanded position (of motor 10 and/or drive mechanism 12) issued from a master control (not shown) and the actual position of drive mechanism 12 fed back from position sensor 16. Position error generator 102 generates a signal output E indicative of position error, i.e., the difference between the commanded position and the actual position of drive mechanism 12. Position error E is used as an input to a comparator 104 which can either be supplied with or configured to compare position error E with a given fixed or adjustable set point SP. The set point SP defines the point (e.g., the amount of offset from the commanded position) at which motor 10 will no longer be allowed to run at or near full speed while moving drive mechanism 12 to its next commanded position. Specifically, comparator 104 operates to determine when position error E has been reduced to a value that is less than set point SP. The selected set point SP can vary with the application. For example, if zero overshoot were critical, the set point SP would be greater than if it were critical to minimize the amount of time (i.e., run motor 10 at full speed for as long as possible) it took to reposition drive mechanism 12.

The output of comparator 104 is used to control a switch 106 that is coupled in the speed feedback line between rate sensor 14 and motor controller 18. Switch 106 is shown in the position it would assume when position error E is less than set point SP. That is, in the illustrated position, switch 106 couples the speed feedback to motor controller 18.

In operation, a commanded position is issued to motor controller 18 which, in turn, instructs motor 10 to run such that drive mechanism 12 is repositioned as commanded. As motor 10/drive mechanism 12 operate, sensors 14 and 16 feedback speed and position signals, respectively. Position error E between position feedback and commanded position is determined by position error generator 102. In the early stages of any given control cycle for repositioning drive mechanism 12, position error E is large thereby making it desirable to run motor 10 at full speed. The size of position error E is generally used by motor controller 18 to set motor voltage or, in other words, set the speed of motor 10.

In most instances of the early stages of a control cycle, position error E will be greater than set point SP. (Note that for a very small commanded position change, position error E will be less than set point SP right from the outset of the control cycle.) When position error E is greater than set point SP, the output of comparator 104 will cause switch 106 to open thereby eliminating speed feedback as an input to motor controller 18. Without speed feedback, motor controller 18 allows motor 10 to run as fast as it can given the supplied motor voltage. However, as drive mechanism 12 moves towards its commanded position, position error E decreases and will eventually be less than set point SP. At this point, switch 106 operates to couple speed feedback to motor controller 18 which uses same to obtain the damping coefficient needed to stop motor 10 at the commanded position.

Figure 3:
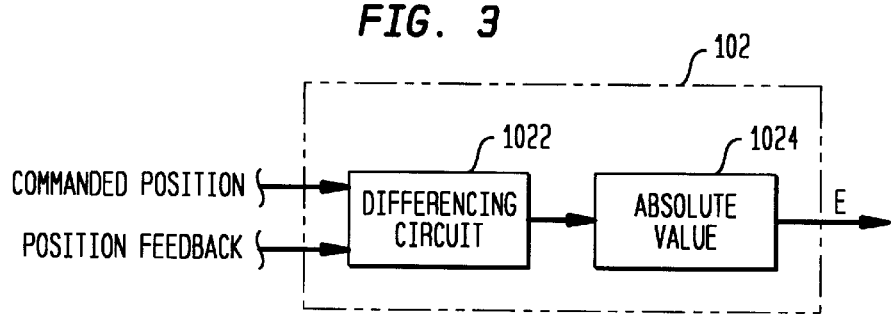
FIG. 3 is a block diagram of one embodiment of the position error generator.
Figure 4:
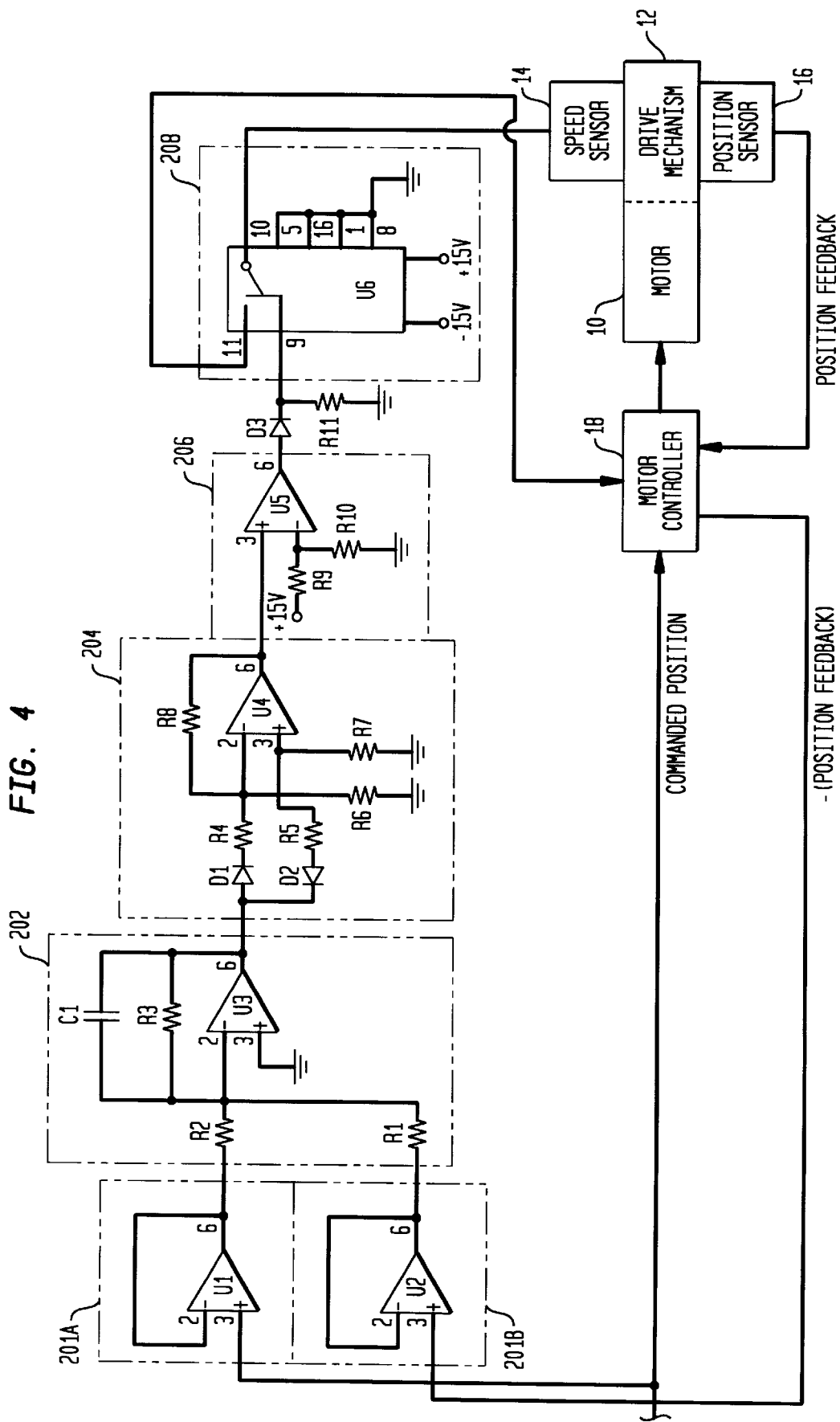
FIG. 4 is a detailed circuit schematic of one implementation of the precision stop control of the present invention.

In cases where the motor and/or drive mechanism are bi-directional, it is desirable for the present invention to be able to disregard the drive mechanism's direction of motion. To do this, position error generator 102 can be implemented as shown in FIG. 3. More specifically, a differencing circuit 1022 determines the plus or minus difference between the commanded position signal and the position feedback signal. The absolute value of the plus or minus difference is then determined at absolute value circuit 1022.

The various block elements described above can be implemented in a variety of ways. By way of example, one circuit implementation of the present invention is illustrated in detail in FIG. 4. Dashed lines are used to block off various functions of the circuit and common reference numerals are used when referencing functional blocks described above. In this specific example, note that position feedback used by the circuit elements of the present invention is a negative position feedback originating from motor controller 18. This is because position feedback is frequently inverted by motor controller 18 for use thereby. An inverting adder circuit 202 can be used to add the commanded position with the negative position feedback to form position error E. Note that in some circumstances it may be desirable for adder circuit 202 to have a high impedance input, i.e., R1 and R2. In such circumstances buffers 201A and 201B can be used to tie in the commanded position and position feedback signals, respectively.

To accommodate a bidirectional motor and/or drive mechanism, an inverting absolute value circuit 204 forms an inverted absolute value of position error E and provides same to a comparator circuit 206. Note that the inversions at adder circuit 202 and absolute value circuit 204 cancel out and are simply due to the particular implementation illustrated. The set point SP of comparator circuit 206 is user definable/adjustable by use of resistors R9 and R10 which can be realized by fixed or user-adjustable resistors. Comparator circuit 206 outputs a discrete signal that toggles between a plus and minus voltage. More specifically, when E>SP, the output of comparator circuit 206 goes "low". When E<SP, the output of comparator circuit 206 goes "high".

The diode/resistor combination D3/R11 condition the output signal of comparator circuit 206 so that it can only be aproximately zero volts ("low" output from circuit 206) or a plus voltage ("high" output from circuit 206) which is used to control analog switch 208. A zero volt signal applied to analog switch 208 keeps the switch open thereby preventing the speed feedback signal from being input to motor controller 18. A plus voltage signal applied to switch 208 closes the switch to supply speed feedback to motor controller 18.

Circuit elements U1, U2, U3 and U4 could be implemented by op amps such as the OP07A available from Precision Monolithic Inc., Santa Clara, Calif. Circuit element U5 could be implemented by an op amp such as the LF156, and diodes D1, D2 and D3 could each be implemented by an 1N4148 diode, all of which are available from National Semiconductor, Santa Clara, Calif. Analog switch 208 could be implemented by a DG202 switch available from Siliconix, Santa Clara, Calif.

The advantages of the present invention are numerous. A motor can be run at full speed to quickly and efficiently attain its new commanded position. However, the present invention makes precise position damping (i.e., no overshoot) possible even when the motor is run at full speed. The present invention will work regardless of the inertia of the system.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An improved stop control system for a motor having a drive mechanism wherein the motor is coupled to a motor controller that controls the speed and position of the drive mechanism using a first signal indicative of a commanded position of the drive mechanism, a second signal indicative of the actual speed of the drive mechanism and a third signal indicative of the actual position of the drive mechanism, said improved stop control system comprising:

a first circuit receiving said first signal and said third signal for generating an error signal indicative of a difference between said first signal and said third signal;

a second circuit coupled to said first circuit, said second circuit receiving said error signal and comparing said error signal with a threshold position error to generate a switch control signal as a result of such comparison; and a switch having a signal input coupled to the motor for receiving said second signal and having a control input coupled to said second circuit for receiving said switch control signal, said switch further having an output coupled to the motor controller, said switch operating to control coupling of said signal input to said output using said switch control signal, wherein said signal input is coupled to said output at least whenever said error signal is less than said threshold position error so that the motor controller can use said second signal in conjunction with said third signal to stop the motor.

2. A system as in claim 1 wherein said first circuit comprises:

a differencing circuit receiving said first signal and said third signal for generating one of a positive version and a negative version of said error signal; and an absolute value circuit coupled to said differencing circuit for generating said error signal that is an absolute value of said one of a positive version and a negative version of said error signal.

3. A system as in claim 1 wherein said second circuit includes means for adjusting said threshold position error.

4. A system as in claim 1 wherein said switch is configured such that said signal input is coupled to said output only when said error signal is less than said threshold position error.

5. An improved stop control system for a motor having a drive mechanism wherein the motor is coupled to a motor controller that controls the speed and position of the drive mechanism using a first signal indicative of a commanded position of the drive mechanism, a second signal indicative of the actual speed of the drive mechanism and a third signal indicative of the actual position of the drive mechanism, wherein the motor controller uses said second signal in conjunction with said third signal to stop the motor, said improved stop control system comprising:

a differencing circuit receiving said first signal and said third signal for generating one of a positive version and a negative version of an error signal indicative of a difference between said first signal and said third signal; and an absolute value circuit coupled to said differencing circuit for generating an absolute value of said one of a positive and a negative version of said error signal;

a comparator circuit coupled to said absolute value circuit for generating a stop control signal when said absolute value is less than a threshold position error; and a switch having a signal input coupled to the motor for receiving said second signal and having a control input coupled to said comparator circuit for receiving said stop control signal, said switch further having an output coupled to the motor controller, said switch coupling said signal input to said output in response to said stop control signal.

6. A method of controlling the stoppage of a motor having a drive mechanism wherein the motor is coupled to a motor controller that controls the speed and position of the drive mechanism using a first signal indicative of a commanded position of the drive mechanism, a second signal indicative of the actual speed of the drive mechanism and a third signal indicative of the actual position of the drive mechanism, said method comprising the steps of:

generating an error signal indicative of a difference between said first signal and said third signal;

providing a threshold position error; and supplying said second signal to the motor controller at least whenever said error signal is less than said threshold position error so that the motor controller can use said second signal in conjunction with said third signal to stop the motor.

7. A method according to claim 6 wherein said step of generating comprises:

generating one of a positive and a negative version of said error signal; and forming an absolute value of said one of a positive and a negative version of said error signal.

8. A method according to claim 6 further comprising the step of limiting said step of supplying to only those times when said error signal is less than said threshold position error.

* * * * *